United States Patent [19]

Traber

[11] Patent Number: 5,547,475
[45] Date of Patent: Aug. 20, 1996

[54] PHOSPHATE-FREE REDUCTION BLEACHING FORMULATION

[75] Inventor: Rainer H. Traber, Reinach, Switzerland

[73] Assignee: Ciba-Geigy Corporation, Tarrytown, N.Y.

[21] Appl. No.: 292,152

[22] Filed: Aug. 17, 1994

[30] Foreign Application Priority Data

Aug. 20, 1993 [CH] Switzerland ............................. 2492/93

[51] Int. Cl.$^6$ ................................. D06L 3/00; D06L 3/10
[52] U.S. Cl. ........................ 8/110; 252/188.22; 510/108; 510/302; 510/303
[58] Field of Search .......................... 252/105, 188.22; 8/111

[56] References Cited

U.S. PATENT DOCUMENTS

| | | | |
|---|---|---|---|
| 2,826,478 | 3/1958 | Schucker | 8/104 |
| 2,963,395 | 12/1960 | Back et al. | 162/83 |
| 3,287,276 | 11/1966 | Poschmann et al. | 252/105 |
| 3,474,037 | 10/1969 | Goldman | 252/99 |
| 3,653,804 | 4/1972 | Janson et al. | 8/110 |
| 3,840,644 | 10/1974 | Leigh | 423/265 |
| 3,984,399 | 10/1976 | Weber et al. | 260/240 |
| 4,082,683 | 4/1978 | Galesloot | 252/105 |
| 4,195,974 | 4/1980 | Kothe et al. | 8/138 |
| 4,729,886 | 3/1988 | Little et al. | 423/515 |
| 5,169,555 | 12/1992 | Mikulski et al. | 252/188.36 |

FOREIGN PATENT DOCUMENTS

| | | |
|---|---|---|
| 641121 | 11/1962 | Belgium . |
| 2324731 | 4/1977 | France . |
| 237449 | 8/1909 | Germany . |
| 1042165 | 10/1958 | Germany . |
| 1594879 | 11/1969 | Germany . |
| 2041566 | 2/1972 | Germany . |
| 4115575 | 11/1992 | Germany . |

OTHER PUBLICATIONS

Rose, Arthur, *The Condensed Chemical Dictionary*, 6th Ed., Reinhold Publishing Company, 1966 pp. 1038–1039.
Chemical Abstracts, 82, (22), No. 142255d.

*Primary Examiner*—Paul Lieberman
*Assistant Examiner*—Gregory R. Delcotto
*Attorney, Agent, or Firm*—Kevin T. Mansfield

[57] ABSTRACT

A phosphate-free reduction bleach formulation comprising
  (a) a reduction bleaching agent and
  (b) a bleach stabiliser selected from
    ($b_1$) a citric acid derivative,
    ($b_2$) a homo- or copolymer of an ethylenically unsaturated mono- or dicarboxylic acid,
    ($b_3$) a water-soluble magnesium salt and
    ($b_4$) an alkali metal salt of tetraboric acid.

The bleach formulation is suitable for the reduction bleaching of vegetable, animal or synthetic fibres as well as paper. High degrees of whiteness are obtained. The formulation is substantially ecologically compatible.

6 Claims, No Drawings

PHOSPHATE-FREE REDUCTION BLEACHING FORMULATION

The present invention relates to phosphate-free bleaching formulations for reduction bleaching, to an application process for the reduction bleaching of natural or synthetic fibre materials and of paper, and to the textile fibre materials treated by said process.

Different fibre materials of vegetable or animal origin or synthetic fibre materials, typically including cotton, synthetic polyamide fibres or wool, can be reduction bleached. The bleaching agent commonly used for the purpose is sodium dithionite (sodium hydrosulfite). Because sodium dithionite oxidises rapidly in aqueous solutions, it is common practice to add stabilisers that have buffering and complexing properties to the bleaching agent. Effective bleach stabilisers are phosphorus-containing compounds. However, the drawback of these compounds is that they can lead to the eutrophication of water.

It is therefore the object of this invention to provide bleach stabilisers that, on the one hand, have good buffering and complexing properties in reduction bleach systems and, on the other, are ecologically compatible, i.e. they comply with environmental ordinances.

Surprisingly, bleach stabilisers have now been found that, on the one hand, are phosphate-free and furthermore are very effective in reduction bleach systems and, in contrast to phosphorus-containing compounds, do not cause eutrophication of water.

Accordingly, the invention relates to a phosphate-free reduction bleach formulation comprising
(a) a reduction bleaching agent and
(b) a bleach stabiliser selected from
  ($b_1$) a citric acid derivative,
  ($b_2$) a homo- or copolymer of an ethylenically unsaturated mono- or dicarboxylic acid,
  ($b_3$) a water-soluble magnesium salt and
  ($b_4$) an alkali metal salt of tetraboric acid.

Component (a) of the bleach formulation of the invention is a bleaching agent conventionally used in reduction bleaching, typically sulfur dioxide, sulfurous acid or acidified sodium bisulfite solution. However, the salts of dithionous acid, in particular the sodium dithionite useful as component (a) in the practice of this invention, are of especial importance in textile technology.

A particularly suitable citric acid derivative ($b_1$) is a water-soluble alkali metal salt of citric acid, typically the lithium, potassium or sodium salt. It is preferred to use the sodium salt. Trisodium titrate dihydrate is particularly preferred.

Starting monomers for the preparation of the homo- or copolymers of ethylenically unsaturated mono-, di- or tricarboxylic acids of component ($b_2$) are ethylenically unsaturated monomeric carboxylic acids, or the anhydrides thereof, which contain an ethylenically unsaturated aliphatic radical, for example (meth)acrylic acid, maleic acid, fumaric acid, itaconic acid, mesaconic acid, citraconic acid, vinylacetic acid, vinylpropionic acid, crotonic acid, aconitic acid, allylacetic acid, vinyloxyacetic acid, allyloxyacetic acid, $\alpha,\beta$-dimethyl(meth)acrylic acid, methylenemalonic acid, 2-hydroxy(meth)acrylic acid, $\alpha$-haloacrylic acid, $\alpha$-carboxyethylacrylate, acrylamidoglycolic acid, $\beta$-carboxyethylacrylate, allyloxy-3-hydroxybutanoic acid, allyloxymalonic acid, allylsuccinic acid, and allylmalonic acid. Monocarboxylic acids of 3 to 5 carbon atoms are preferred, for example acrylic acid, methacrylic acid, 2-halo(meth)acrylic acid, 2-hydroxyethylacrylic acid, $\alpha$-cyanoacrylic acid, crotonic acid and vinylacetic acid. Preferred ethylenically unsaturated dicarboxylic acids are fumaric acid, maleic acid or itaconic acid, and also mesaconic acid, citraconic acid, glutaconic acid and methylmalonic acid. The preferred anhydride of these acids is maleic anhydride.

Preferred polymerised carboxylic acids are polymethacrylic acid, polyacrylic acid and, more particularly, the copolymer of acrylic acid and maleic acid. The homo- or copolymers to be used in the practice of this invention have a molecular weight in the range from 2000 to 2 000 000, preferably from 2000 to 800 000.

The homo- or copolymers polymers useful as component ($b_2$) of the formulation of the invention are prepared by methods which are known per se, conveniently by polymerising the appropriate monomer in the presence of a catalyst, suitably in the temperature range from 60° to 100° C.

The catalyst for the preparation of component ($b_2$) is preferably an initiator that forms free radicals. Illustrative examples of suitable initiators for carrying out the reaction are symmetrical aliphatic azo compounds such as azobisisobutyronitrile, azobis(2-methylvaleronitrile), 1,1'-azobis(1-cyclohexanitrile) and alkyl 2,2'-azobisisobutyrate; symmetrical diacyl peroxides such as acetyl, propionyl or butyryl peroxide, benzoyl peroxide, bromine-, nitro-, methyl- or methoxy-substituted benzoyl peroxides as well as lauroyl peroxide; symmetrical peroxydicarbonates such as diethyl, diisopropyl, dicyclohexyl and dibenzyl peroxydicarbonate; tert-butyl peroctoate, tert-butyl perbenzoate or tert-butylphenyl peracetate as well as peroxycarbamates such as tert-butyl-N-(phenylperoxy)carbamate or tert-butyl-N-(2,3-dichloro- or -4-chlorophenylperoxy)carbamate. Further suitable peroxides are: tert-butylhydroperoxide, di-tert-butylperoxide, cumene hydroperoxide, dicumene peroxide and tert-butylperpivalate. A further suitable compound is potassium persulfate, which is preferably used in the practice of this invention.

The catalyst is normally used in an amount of 0.1 to 10% by weight, preferably of 0.5 to 2% by weight, based on the starting materials.

It is advantageous to carry out the polymerisation reaction in an inert atmosphere, conveniently in a nitrogen atmosphere.

The homo- or copolymers used in the bleach formulation of the invention preferably can also be used in admixture with a water-soluble alkali metal salt such as sodium carbonate. A mixture of polyacrylic acid having a molecular weight of c. 4500 and sodium carbonate is preferred.

It is preferred to use a magnesium salt of gluconic acid as component ($b_3$), most preferably magnesium mono- or digluconate. Magnesium gluconate itself may be used in the formulation of the invention, preferably as solid. In another embodiment of the invention, the gluconate may, however, also be formed in situ from gluconic acid and magnesium hydroxide or magnesium oxide, preferably magnesium hydroxide. Furthermore, gluconic acid or the sodium salt thereof can be used in combination with a water-soluble magnesium salt. A water-soluble magnesium salt may suitably be in this case the acetate, preferably the sulfate or the heptahydrate thereof and, most preferably, the chloride or the hexahydrate thereof. The magnesium salt is usually added as solid, preferably in the form of solid magnesium chloride hexahydrate.

The preferred component ($b_4$) is potassium tetraborate and, most preferably, sodium tetraborate.

A preferred reduction bleach formulation comprises
(a) sodium dithionite and (b) a citric acid derivative.

A further preferred bleach formulation comprises
(a) sodium dithionite and
(b) a copolymer of acrylic acid and maleic acid.

In addition to the mandatory components (a) and (b), the bleach formulation of the invention also comprises a wetting agent as optional component (c) and/or a fluorescent whitening agent as component (d).

Suitable wetting agents or surfactants are anionic or nonionic surfactants (nio-surfactants), especially mixtures thereof. Typical examples of preferred anionic surfactants are alkylarylmonosulfonates, fatty acid condensates, proteolysis products or salts thereof and, most preferably, alkylmonosulfonates and alkylbenzenemonosulfonic acids containing 12 to 22 carbon atoms in the alkyl moiety. Illustrative examples of nonionic surfactants are polyadducts of alkylene oxides, preferably propylene oxide and, most preferably, ethylene oxide and alkylphenols containing 4 to 12 carbon atoms in the alkyl moiety, preferably fatty acid amides and, more particularly, optionally end-capped fatty alcohols, polyadducts of ethylene oxide and fatty alcohols being especially preferred, mixtures of which polyadducts with the alkylmonosulfonates of the indicated kind being in turn very particularly preferred. Further suitable components in these mixtures are also silicone surfactants.

Wetting agents are added to the bleach liquors especially whenever the fibre material to be treated is cellulose that is in the untreated state or, preferably, consists of raw cotton.

Antifoams and deaerators may also be added to the bleaching liquors. Their addition is indicated especially if the liquor contains a wetting agent and/or surfactant. They are typically higher alcohols, especially isooctanol, but are preferably silicone-based antifoams and/or deaerators, most preferably silicone oil emulsions.

The fluorescent whitening agents also added to the bleaching liquors as optional component in order to impart to the treated material a particularly high degree of whiteness usually belong to the styryl and stilbene classes, and are typically distyrylarylenes, diaminostilbenes, ditriazolyl stilbenes, phenylbenzoxazolyl stilbenes, stilbene naphthotriazoles and dibenzoxazolyl stilbenes. Preferred fluorescent whitening agents are those of the distyryl biphenyl or bis(triazinyl)aminostilbene type which contain sulfonic acid groups, e.g. sulfonated bis(styryl)biphenyl and bis(triazinyl) derivatives, preferably the bis(phenylaminomorpholino-s-triazinyl)stilbenedisulfonic acids obtained in the form of alkali metal salts, in particular potassium or, preferably, sodium salts. These fluorescent whiteners are preferably used as commercial aqueous c. 20–30 percent by weight liquid formulations.

The bleach formulation of this invention will usually comprise
30 to 80% by weight of component (a),
20 to 70% by weight of component (b),
0 to 10% by weight of component (c), and
0 to 10% by weight of component (d).

The bleach formulation of the invention is prepared by mixing the individual components and, if appropriate, simultaneously grinding the mixture in a ball mill. Grinding is not necessary if the starting materials are of similar granular size. The grinding procedure is purely mechanical. A chemical reaction between the individual components does not take place.

The invention further relates to the application process for the reduction bleaching of natural or synthetic fibre materials. The process comprises treating the fibre material with an aqueous liquor that comprises at least the bleach formulation of the invention.

The application process for the reduction bleaching of natural or synthetic fibre materials using the formulation of the invention is carried out by methods that are known per se. A distinction is made here between a treatment in long liquors, a cold bad-batch bleaching process and an immersion bleaching process.

In long liquors the material is subjected to a treatment at a liquor to goods ratio of about 1:10, e.g. in a jigger, to about 1:100, e.g. on a winchbeck, for about 1 to 3 hours at elevated temperature. The treatment temperature is in the range from about 40° to 140° C., preferably from 60° to 100° C., under normal conditions, i.e. under atmospheric pressure or above 100° C., preferably in the range from 105° to 140° C., under so-called HT conditions (HT=high-temperature).

The immersion bleaching treatment is carried out under the same application conditions, except that the concentration of bleaching agent is higher.

In the cold pad-batch bleaching process, the material to be treated is impregnated by immersion in a padding liquor and then pinched-off, the padding liquor usually having a temperature of 20° to 95° C. Impregnation is preferably carded out at room temperature. The chemicals applied by impregnation then act on the textile material, the treatment time, the temperature and the concentration of the chemicals being in direct relation to one another, and the chosen conditions depending on the nature of fibre material and, in particular, on the apparatus used. Thereafter the impregnated and preferably rolled-up goods are stored at room temperature (15°–30° C.) for 3 to 24 hours, the batching time depending on the type of bleaching bath. The fibre materials are afterwards thoroughly rinsed first with hot water of 90°–98° C., then with warm and, finally, with cold water, if required neutralised with e.g. acetic acid and then hydroextracted and dried preferably at elevated temperature of up to e.g. 150° C.

Depending on whether they are long liquors, immersion liquors or cold pad-batch bleaching liquors, the aqueous bleaching liquors are formulated as indicated.

The long-bleaching liquors usually comprise
1 to 8 g/l, preferably 2 to 3 g/l, of the aqueous formulation of the invention,
0.5 to 3 g/l, preferably 1 to 2 g/l, of a wetting agent or surfactant,
0 to 1 g/l, preferably 0.2 to 0.5 g/l, of an antifoam or deaerator, and
0 to 2% by weight, preferably 0.5 to 1.5% by weight, of a fluorescent whitening agent.

The immersion bleaching liquors usually comprise
2 to 10 g/l, preferably 3 to 6 g/l, of the aqueous formulation of the invention,
1 to 5 g/l, preferably 2 to 4 g/l, of a wetting agent or surfactant,
0 to 2 g/l, preferably 0.5 to 1 g/l, of an antifoam or deaerator, and
0 to 2% by weight, preferably 1 to 2% by weight, of a fluorescent whitening agent.

The cold pad-batch bleaching liquors usually comprise
20 to 100 g/kg, preferably 40 to 60 g/kg, of the aqueous formulation of the invention,
2 to 10 g/kg, preferably 3 to 5 g/kg, of a wetting agent or surfactant,
0 to 3 g/kg, preferably 0.5 to 1.5 g/kg, of an antifoam or aleaerator, and
0 to 2% by weight, preferably 1 to 2% by weight, of a fluorescent whitening agent.

The relatively minor amounts of formulation of the invention and hence also of component (b) in the individual bleach liquors indicate that the bleach stabiliser used in the practice of this invention is not used as sequestrant, but serves the purpose of beneficially influencing the bleaching action of the sodium dithionite.

The fibre material to be treated may be in any form of presentation, typically as loose material, yarn, woven or knitted goods. It will usually always consist of textile fabrics that are made from pure textile cellulose fibres of vegetable or animal origin or from synthetic fibres, or blends of vegetable, animal and/or synthetic fibre materials.

Suitable fibres of vegetable origin are especially cellulosic fibres, typically those from regenerated cellulose such as viscose rayon or viscose, those from natural cellulose such as hemp, linen, jute and ramie and, in particular, cotton. Fibres of animal origin are preferably wool or silk. Synthetic fibres are suitably those made from polyacrylonitrile and, in particular, from polyester and polyamide.

Polyamide fibre material will be understood as meaning in the context of this invention synthetic polyamide such as polyamide 6, polyamide 66 or also polyamide 12. In addition to pure polyamide fibres, polyurethane and polyamide blends, for example tricot materials made from polyamide/polyurethane in the ratio 70:30 are also suitable. Basically, the pure or blended polyamide fibre material may be in any form of presentation, including fibres, yarn, woven fabrics, knitted fabrics, nonwovens or carpets.

Polyester fibre material which can be treated in this invention will be understood as including cellulose ester fibres such as cellulose secondary acetate and cellulose triacetate fibres and, preferably linear polyester fibres which may also be acid-modified, and which are obtained by condensation of terephthalic acid with ethylene glycol or of isophthalic acid or terephthalic acid with 1,4-bis(hydroxymethyl)cyclohexane, as well as copolymers of terephthalic and isophthalic acid and ethylene glycol. The linear polyester fibre material hitherto used almost exclusively in the textile industry consists of terephthalic acid and ethylene glycol.

The fibre materials may also be used as blends with one another or with other fibres, typically blends of polyacrylonitril/polyester, polyamide/polyester, polyester/cotton, polyester/viscose and polyester/wool, and can be dyed or also printed batchwise or continuously by known processes.

Cotton or regenerated cellulose fabrics or blends of cotton and polyester and of cotton and polyamide are particularly suitable for treatment in the practice of this invention. Cotton woven and knitted goods are preferred. Materials that have been prewashed with surfactants are also suitable. It is also possible to bleach sized cotton fabrics, in which case bleaching is carded out before or, preferably, after desizing.

The bleach formulation of the invention can also be used for postbleaching oxidation (peroxide) bleaches. It is common knowledge that superior whiteness is obtained with oxidation peroxide bleaching methods; but the bleach effects are relatively unstable without a reductive aftertreatment, especially when bleaching animal fibre materials. Depending on the treatment medium, bleached wool can undergo substantial yellowing over a short period of time. To obtain a stable intrinsic white, a subsequent reductive bleach is therefore unavoidable. In addition, such a postbleach in addition to stabilisation effects a substantial increase in the intrinsic white.

The fibre materials treated with the formulation of the invention are distinguished by their high degree of whiteness. A further advantage of the bleach formulation of the invention resides in the feature that it is ecologically compatible and is able to comply with environmental ordinances.

In addition, the formulation of the invention can be used for bleaching paper. The invention thus further relates to a process for bleaching paper. The process comprises treating the pulp prepared for bleaching with an aqueous liquor that comprises at least the bleach formulation of the invention. The process of this invention is particularly suitable for bleaching waste paper.

The process is usually carded out by subjecting waste paper first to a high-density cleansing in a stock preparation plant, as for example in a waste paper preparation plant supplied by Sulzer Papertec, normally consisting of a pulper. A hole and slot screening is then effected, a purification from heavy and light components and a first wash. The paper so prepared is then dispersed. In this stage the pulp is homogenised. Any printing ink adhering to the paper fibres is removed. The bleach process is carried out simultaneously, the bleach formulation of the invention being added to the pulp in amounts of 0.1 to 10% by weight, preferably of 0.3 to 1.0% by weight, based on the pulp to be bleached.

An essential advantage of the process of the invention for bleaching paper, especially waste paper, is that the entire waste paper preparation process can be carried out in a neutral pH range without a sudden rise in the pH. A fluorescent whitening agent that may be present in the paper to be treated is not destroyed by the bleaching process of the invention.

In the following Examples parts and percentages are always by weight.

EXAMPLE 1

Preparation of the bleach formulation of the invention 600 g of sodium dithionite and
400 g of trisodium citrate dihydrate
are mixed together and the mixture is ground in a ball mill. A finely particulate, readily flowable powder is obtained.

EXAMPLE 2

Single step bleach

With constant liquor circulation, untreated wool tricot fabric is treated in an Ahiba® dyeing machine with a bleaching liquor of the following composition for 2 hours at 50° C:

5 g/l of the bleach formulation of Example 1 and
0.5 g/l of a wetting agent based on polyacrylic acid and a nonionic surfactant.

The wool tricot is thoroughly washed after the treatment. The bleached wool tricot has a good degree of whiteness.

EXAMPLE 3

Combination bleach

In the first step (oxidation bleach), untreated cotton tricot is treated, with agitation, in a machine, for example an Ahiba® dyeing apparatus with a bleaching liquor of the following composition for 30 minutes at 95° C.:

6 ml/l of 35% hydrogen peroxide,
0.5 g/l of a wetting agent based on polyacrylic acid and a nonionic surfactant,
0.5 g/l of a magnesium salt bleach stabiliser, and
3 g/l of 100% NaOH.

The liquor to goods ratio is 1:20. After the treatment, the bleached tricot is thoroughly washed.

The bleach solution of the 2nd step (reduction bleach) comprises the following components:
5 g/l of the bleach formulation of Example 1,
0.5 g/l of a wetting agent based on polyacrylic acid and a nonionic surfactant.

Treatment is effected as described in Example 2 for 30 minutes and at 60° C. The cotton tricot is afterwards thoroughly washed. It has a high degree of whiteness.

EXAMPLE 4

Combination bleach

A linen fabric is treated in a first step (oxidation bleach) with agitation, for 1 hour at room temperature with a solution of the following composition:
3 g/l of sodium hypochlorite and
1 g/l of a wetting agent based on polyacrylic acid and a nonionic surfactant.

The treated fabric is afterwards thoroughly washed.

The bleach solution of the 2nd step (reduction bleach) has the following composition:
5 g/l of the bleach formulation of Example 1 and
0.5 g/l of a wetting agent based on polyacrylic acid and a nonionic surfactant.

The treatment is carried out as described in Example 2. The treatment time is 2 hours and the temperature is 50° C.

Finally, the bleached linen fabric is thoroughly washed. A high degree of whiteness is achieved.

EXAMPLE 5

In a laboratory experiment, 15g of dry waste paper pulp prepared for the bleaching process is treated in
100 ml of water (15% solids content) with
0.006 g of a formulation comprising
  60% of sodium dithionite and
  40% of trisodium citrate dihydrate
for 7 minutes and 20 minutes, respectively, in a bleach dwell process at a temperature of 80° C.

The following degrees of whiteness (according to Tappi) are obtained:
after a treatment time of 7 minutes: 76.8
after a treatment time of 20 minutes: 78.4

What is claimed is:

1. A process for the reduction bleaching of natural or synthetic fibre materials selected from wool, silk, polyester and synthetic polyamide, which comprises treating said fibre material with an aqueous liquor comprising at least
  (a) 30 to 80% by weight of a reduction bleaching agent which is the salt of dithionous acid and
  (b) 20 to 70% by weight Of a bleach stabiliser which is a water-soluble alkali metal salt of citric acid.

2. A process according to claim 1, wherein component (a) is sodium dithionite.

3. A process according to claim 1, wherein component (b) is trisodium citrate dihydrate.

4. A process according to claim 1, wherein the aqueous liquor comprises
  (a) sodium dithionite and
  (b) trisodium citrate dihydrate.

5. A process according to claim 1, wherein the aqueous liquor additionally comprises a wetting agent as component (c).

6. A process according to claim 1, wherein the aqueous liquor additionally comprises a fluorescent whitening agent as component (d).

* * * * *